United States Patent
Legrand et al.

(10) Patent No.: US 7,388,934 B2
(45) Date of Patent: Jun. 17, 2008

(54) DETECTION AND CORRECTION OF PHASE JUMPS IN A PHASE SEQUENCE

(75) Inventors: Delphine Legrand, Paris (FR); Americo Brajal, Villeneuve le Roi (FR); Antoine Chouly, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1063 days.

(21) Appl. No.: 10/069,741

(22) PCT Filed: Jun. 25, 2001

(86) PCT No.: PCT/EP01/07188

§ 371 (c)(1),
(2), (4) Date: Feb. 26, 2002

(87) PCT Pub. No.: WO02/01825

PCT Pub. Date: Jan. 3, 2002

(65) Prior Publication Data

US 2002/0168032 A1 Nov. 14, 2002

(30) Foreign Application Priority Data

Jun. 27, 2000 (FR) .................................. 00 08268

(51) Int. Cl.
*H03D 3/22* (2006.01)
*H04L 27/22* (2006.01)

(52) U.S. Cl. ........................................ 375/329; 375/326

(58) Field of Classification Search ................ 375/226, 375/371, 279, 324, 326, 329, 375
See application file for complete search history.

(56) References Cited

U.S. PATENT DOCUMENTS

| | | | | | |
|---|---|---|---|---|---|
| 4,057,762 | A | * | 11/1977 | Namiki ........................ | 375/376 |
| 4,847,872 | A | * | 7/1989 | Hespelt et al. .............. | 375/344 |
| 4,983,906 | A | * | 1/1991 | Hiller ....................... | 324/76.47 |
| 5,287,067 | A | * | 2/1994 | Denno et al. ............... | 329/304 |
| 5,553,014 | A | * | 9/1996 | De Leon et al. ............ | 708/322 |
| 5,619,537 | A | * | 4/1997 | Altes .......................... | 375/322 |

(Continued)

FOREIGN PATENT DOCUMENTS

EP 0349064 1/1990

(Continued)

OTHER PUBLICATIONS http://www.cs.may.ie/research/sigsys/kidson/sld011.htm.*

(Continued)

*Primary Examiner*—Chieh M. Fan
*Assistant Examiner*—Freshteh N. Aghdam
(74) *Attorney, Agent, or Firm*—Paul Im

(57) ABSTRACT

According to one example embodiment, a communication system includes a transmitter and a receiver for receiving symbols from a phase-shift shift keying modulation. The system also includes estimation means for estimating a frequency error relating to a symbol based on a sequence of symbol phases. The receiver includes calculation means for calculating a phase sequence, called an initial sequence, based on decisions made on symbols. The receiver also includes means for detecting and correcting phase jumps in this initial sequence in order to supply a phase sequence, called a final sequence, to the frequency error estimation means.

7 Claims, 4 Drawing Sheets

U.S. PATENT DOCUMENTS

| | | | | |
|---|---|---|---|---|
| 5,920,228 | A * | 7/1999 | Soga et al. | 329/304 |
| 6,038,267 | A * | 3/2000 | Oura et al. | 375/329 |
| 6,181,755 | B1 * | 1/2001 | Junell | 375/362 |
| 6,683,921 | B1 * | 1/2004 | Shiraishi et al. | 375/331 |
| 2002/0071506 | A1 * | 6/2002 | Lindquist et al. | 375/344 |

FOREIGN PATENT DOCUMENTS

| | | |
|---|---|---|
| EP | 0648037 | 4/1995 |
| EP | 0940958 | 9/1999 |

OTHER PUBLICATIONS

Morelli et al, Feedforward Frequency Estimation for PSK: a Tutorial Review, IEEE, vol. 9, No. 2, Mar.-Apr. 1998, pp. 103-115.*

Numerical Recipes in C, the art of scientific computing, 2nd edition, pp. 523-524.*

"Feedforward Frequency Estimation for PSK: a Tutorial Review" by M. Morelli and U. Mengali, published in the journal "European Transactions on Telecommunications", vol. 9, No. 2, Mar.-Apr. 1998.

"Comparison between digital recovery techniques in the presence of frequency shift" by F. Daffara and J. Lamour, International Conference on Communications, New Orleans, USA, May 1-5, 1994, vol. 2, pp. 940 and 945.

"Numerical Recipes in C", The Art of Scientific Computing Second Edition, by William H. Press et al.—Cambridge University Press; 1992.

* cited by examiner

US 7,388,934 B2

DETECTION AND CORRECTION OF PHASE JUMPS IN A PHASE SEQUENCE

FIELD OF THE INVENTION

The invention relates to a communication system comprising at least a transmitter and a receiver intended to receive symbols coming from a PSK modulation, and comprising estimation means for estimating a frequency error relating to a symbol based on a sequence of symbol phases. The invention also relates to a receiver intended to be used in such a communication system.

The invention also relates to a method of estimating a frequency error relating to a received symbol, coming from a PSK modulation, based on a sequence of symbol phases, and to a method of detecting and correcting phase jumps in an initial phase sequence of symbols coming from a PSK modulation.

The invention finally relates to computer programs comprising instructions for implementing such methods.

BACKGROUND OF THE INVENTION

Such an estimation algorithm of a frequency error relating to a received symbol based on a phase sequence is described, for example, in paragraph 4.1 (page 107) of the article <<Feedforward Frequency Estimation for PSK: a Tutorial Review>> by M. Morelli and U. Mengali, published in the journal <<European Transactions on Telecommunications, vol. 9, no. 2, March-April 1998>>. This algorithm is known by the name of Tretter algorithm, or least squares method.

To obtain such a phase sequence, it is known that a phase estimation algorithm is used, which estimates the phase relating to a received symbol on the basis of decisions made on various received symbols. For example, the expectation maximization algorithm is used, which is described in paragraph 3.3 of the conference report of the <<International Conference on Communications, New Orleans, USA, 1-5 May, 1994, vol. 2, pp. 940 and 945>>, entitled <<Comparison between digital recovery techniques in the presence of frequency shift>> by F. Daffara and J. Lamour.

The problem posed is the following: in a PSK modulation comprising $2^n$ points, two adjacent points have a phase difference of $$\frac{\pi}{2^{n-1}}.$$

When the frequency error is such that, based on a certain symbol, an error is made in the decision, this error is translated by a phase jump of $$\pm \frac{\pi}{2^{n-1}}$$

in the sequence of phase estimates obtained. The number of phase jumps that may be obtained depends on the number of symbols contained in the packet and the initial frequency difference.

When the sequence of phases, which are used for applying the Tretter algorithm, includes one or various phase jumps, the frequency estimate obtained is inaccurate. The invention notably has for its object to provide a solution to this problem.

SUMMARY OF THE INVENTION

For this purpose, a communication system according to the invention and as described in the opening paragraph is characterized in that said receiver comprises calculation means for calculating a phase sequence, called initial sequence, based on decisions made on symbols, and means for detecting and correcting phase jumps in this initial sequence, to supply a phase sequence, called final sequence, to said frequency error estimation means.

Advantageously, said means for detecting and correcting phase jumps comprise:
  modifying means for modifying said initial sequence, so as to produce a plurality of modified sequences which each compensate for a phase jump configuration,
  calculation means for calculating straight line equations which determine the initial sequence and the modified sequences,
  calculation means for calculating for the initial sequence and the modified sequences a mean difference between the initial or modified phases and the phases produced by the corresponding straight line equation, said final sequence being formed by the sequence whose mean difference is minimal.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF PREFERRED EMBODIMENTS

Figure 1:
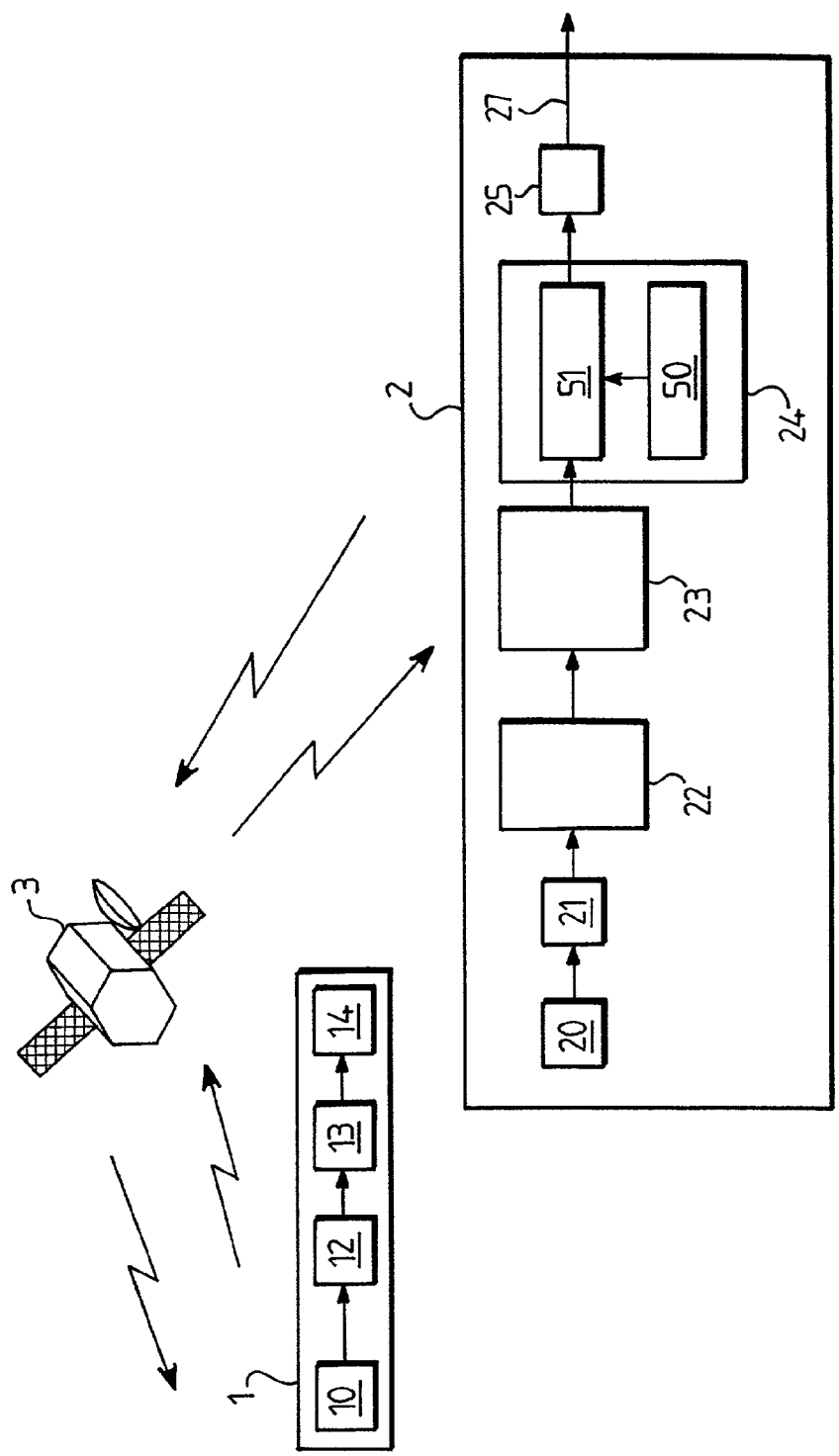
FIG. 1 is a diagram of an example of a communication system according to the invention.

In FIG. 1 is represented an example of a communication system according to the invention. This communication system comprises interactive user terminals 1, which are transmitters within the meaning of the invention, and a head-end station 2, which is a receiver within the meaning of the invention. The head-end station 2 transmits signals in a first frequency band Ku (12-14 GHz). These signals are relayed to interactive user terminals 1 by a satellite 3. The interactive user terminals transmit signals in a second frequency band Ka (20-30 GHz). These signals are relayed to the head-end station 2 by the satellite 3.

Each terminal 1 comprises a data source 10 and channel coding means 12. The channel coding means deliver packets of N symbols which contain preamble symbols and data symbols. These packets are then transmitted to filter means 13 and, finally, to modulation means 14, which use a local oscillator that has a frequency $f_c$.

The head-end station 2 comprises demodulation means 20 which use a local oscillator that has a frequency $f_c+\Delta f_0/Ts$ (where $\Delta f_0$ is a normalized frequency difference relative to the symbol frequency, and Ts is the duration of the symbols), and an initial phase $\Theta_0$. The head-end station 2 also comprises filter means 21 and sampling means 22, which sample the output signal of the filter 21, to deliver symbols called received symbols. The received symbols are transmitted to frequency recovery means 23 which estimate the normalized frequency difference $\Delta f_0$ and correct the received symbols to compensate for the estimated difference $$\hat{\Delta f_0}.$$

The frequency recovery means 23 deliver frequency-corrected symbols. These frequency-corrected symbols are transmitted to phase recovery means 24. The phase-corrected and frequency-corrected symbols are finally transmitted to channel decoding means 25 which deliver data 27.

In the example described here, the phase recovery means 24 comprise phase and frequency estimation means 50 and phase correction means 51. The phase estimation means 50 are described with reference to FIG. 2. They are formed by a loop intended to be passed through L times. In the following of the description the index m (m=1 to L) is a loop counter. Each value of m thus corresponds to one loop path. The loop comprises:

conventional phase estimation means 52 (for example, expectation maximization) for producing an initial phase sequence S1 relating to a symbol packet $r_k^{(m-1)}$ (m=1 to L, and k=1 to q, where q≦N), means 53 for calculating a frequency error relating to said packet, based on the initial sequence S1, means 54 for correcting the frequency of the symbols of the packet, to correct said frequency error, loop means 55 which supply the frequency-corrected symbols $r_k^{(m)}$ to phase estimation means 52 for a following path through the loop, and loop output means 56 which supply to the phase correction means 51 the phases estimated by the phase estimation means 52 (or, directly, the correction to be made), and the symbols to be corrected.

The calculation means 53 calculate a frequency error estimate $\hat{\Delta f}_m$ relating to the symbols $r_k^{(m-1)}$ of a same packet, based on the initial phase sequence S1 produced by the phase estimation means 52. The values of this phase sequence S1 are between $-\infty$ and $+\infty$. The calculation means 53 comprise:

means 60 for detecting and correcting phase jumps to correct this initial sequence S1 and to deliver a final sequence S2, means 62 for calculating the slope of a straight line which is closest possible to the values of the sequence S2, by applying the Tretter algorithm. The slope obtained forms a frequency error estimate $\hat{\Delta f}_m$ relating to the symbols of the packet. It is this frequency error that is transmitted to the frequency correction means 54. The symbols obtained after frequency correction, $r_k^{(m)}=r_k^{(m-1)} \cdot e^{-2\pi jk\Delta f m}$, are transmitted to the phase estimation means 52 for a new path through the loop. During the last path through the loop (m=L), the symbols $r_k^{(L-1)}$ to be corrected and the phase correction $$e^{-j\hat{\Theta}_k^{(L)}}$$

to be made to these symbols are transmitted to the phase correction means 51.

Figure 3:
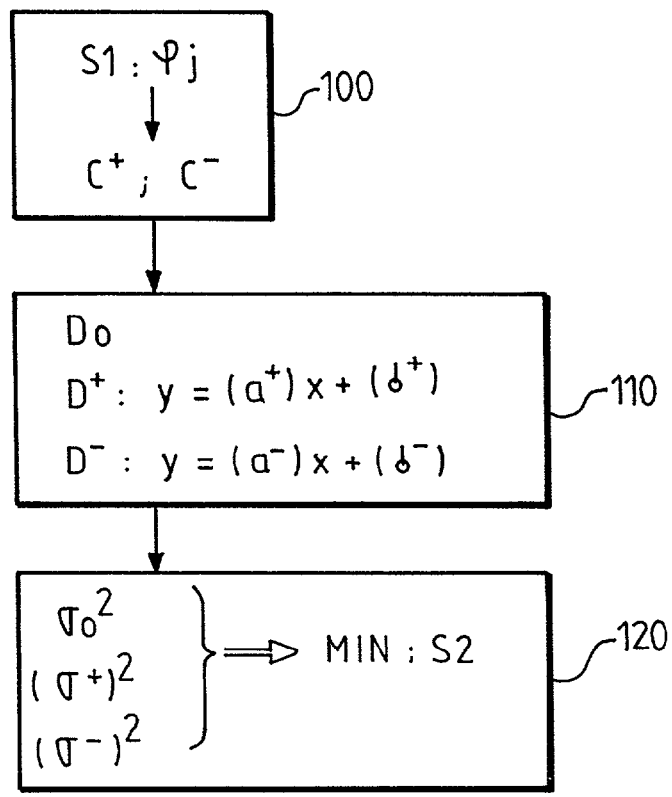
FIG. 3 is a flow chart diagram describing the operations used by the phase jump correction and detection means according to the invention.

The means 60 for detecting and correcting phase jumps are represented in FIG. 3. They comprise:

means 100 for modifying the initial sequence to compensate for a plurality of phase jump configurations; the correction means 100 produce a plurality of modified sequences which correspond each to the correction of a phase jump configuration;

means 110 for calculating straight line equations which determine the initial sequence and the modified sequences, calculation means 120 for calculating for the initial sequence and the modified sequences a mean difference between the initial and modified phases and the phases produced by the corresponding straight line equation, said final sequence being formed by the sequence whose mean difference is minimal.

The use of the means 60 for detecting and correcting phase jumps is different and depends on the number of phase jumps one wishes to correct. But the method applied remains the same. The invention can thus be applied to any number of phase jumps. Now two examples of embodiment will be described of the means 60 for detecting and correcting phase jumps:

a first example, in which the means 60 for detecting and correcting phase jumps are intended to correct a single phase jump of $$\pm \frac{\pi}{2};$$

a second example, in which the means 60 for detecting and correcting phase jumps are intended to correct two phase jumps of $$\pm \frac{\pi}{2}$$

in the same direction; this second example corresponds to the most probable case where the transmitted packets are ATM cells of 53 octets.

In the examples that will be described, the modification means 100 modify the initial sequence S1 phase by phase. But, for diminishing the number of calculations to be performed, it is possible to modify the sequence phase-group by phase-group. This is equivalent to compensating only for certain configurations of phase jumps.

Figure 4:
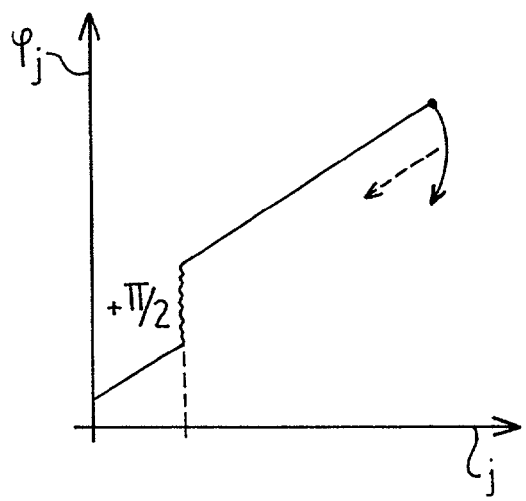
FIG. 4 is a representation of a phase sequence including a phase jump.

The first example of embodiment of the means 60 for detecting and correcting phase jumps is described with reference to FIG. 4. In FIG. 4 is represented an example of an initial sequence S1 comprising a phase jump of $$+\frac{\pi}{2}.$$

The means 60 for detecting and correcting phase jumps have for their function to detect the position and the direction of the phase jump and then correct it. Therefore, as indicated in FIG. 3, they perform the following operations:

a) The Tretter algorithm is applied to the initial sequence S1 formed by phases ($\phi_j$(j=0 to q−1)) to obtain the straight line equation $D_0$ which determines this sequence. This equation is written as:

$D_0: y = a_0 \cdot x + b_0$ with:

$a_0 = \alpha \cdot S' - \beta \cdot S$ and $b_0 = \gamma \cdot S - \beta \cdot S'$ where $$S = \sum_{j=0}^{q-1} \varphi_j, \; S' = \sum_{j=0}^{q-1} j \cdot \varphi_j, \; \alpha = 12/(q \cdot (q^2 - 1)), \; \beta = 6/(q \cdot (q+1))$$

and $\gamma = 2(2q-1)/(q(q+1))$

These expressions can easily be derived from the calculations shown on pages 523 and 524 of the title <<Numerical Recipes in C, the art of scientific computing, second edition>> by W. H. Press, S. A. Teukolsky, W. T. Vetterling, and B. P. Flannery, published by Cambridge University Press in 1995, while considering that the uncertainty of the phases is constant whatever j.

b) An initial mean difference $(\sigma_0)^2$ is calculated between the phases $\phi_j$ of the initial sequence S1 and the phases y(j) coming from the straight line equation $D_0$.

$$(\sigma_0)^2 = \frac{1}{q} \sum_{j=0}^{q-1} |\varphi_j - (a_0 \cdot j + b_0)|^2$$

c) The initial sequence S1 is run through point by point by starting from the end (symbol of rank q−1); the index i is a counter that indicates the position of the phase jump (i=q−1, . . . , 0).

d) With each step the phases $\phi j$ (j=q−i, . . . , q−1) are modified by $+\frac{\pi}{2}$, so that a modified sequence $C_i^+$ is obtained. This sequence $C_i^+$ is thus constituted by phases $$\varphi_j^+ = \begin{cases} \varphi_j & \text{pour } j = 0, \dots, q-i-1 \\ \varphi_j + \frac{\pi}{2} & \text{pour } j = q-i, \dots, q-1 \end{cases}$$

e) With each step one straight line equation $D_i^+$ is calculated, which straight lines determine the modified sequence $C_i^+$. This equation is written as:

$D_i^+: y = (a_i)^+ \cdot x + (b_i)^+$ with:

$a_i^+ = \alpha \cdot (S_i')^+ - \beta \cdot (S_i)^+$ and $b_i^+ = \gamma \cdot (S_i)^+ - \beta \cdot (S_i')^+$ where $(S_i)^+ =$ $$\sum_{j=0}^{q-1} \varphi_j^+ = S + i \cdot \frac{\pi}{2} \text{ and } (S_i')^+ = \sum_{j=0}^{q-1} j \cdot \varphi_j^+ = S' + \frac{\pi}{2} \cdot i \left(q - \frac{(i+1)}{2}\right)$$

that is to say, $$a_i^+ = a_0 + \alpha \cdot \frac{\pi}{2} \cdot i \cdot \left(q - \frac{i+1}{2}\right) - \beta \cdot i \cdot \frac{\pi}{2} =$$

$$a_0 + (A_i^+) \text{ with } (A_i^+) = \alpha \cdot \frac{\pi}{2} \cdot i \cdot \left(q - \frac{i+1}{2}\right) - \beta \cdot i \cdot \frac{\pi}{2}$$

and $b_i^+ = b_0 + \gamma \cdot i \cdot \frac{\pi}{2} - \beta \cdot \frac{\pi}{2} \cdot i \cdot \left(q - \frac{i+1}{2}\right) =$ $$b_0 + (B_i^+) \text{ with } (B_i^+) = \gamma \cdot i \cdot \frac{\pi}{2} - \beta \cdot \frac{\pi}{2} \cdot i \cdot \left(q - \frac{i+1}{2}\right)$$

f) For each modified sequence $C_i^+$ is calculated a mean difference $(\sigma_1^+)^2$ between the phases $\phi_j^+$ of the modified sequence $C_i^+$ and the phases y(j) coming from the straight line equation $D_i^+$.

$$(\sigma_i^+)^2 = \frac{1}{q} \sum_{j=0}^{q-1} |\varphi_j^+ - [(a_i)^+ \cdot j + (b_i)^+]|^2$$

g) The operations c) to f) are repeated while the phases $\phi_j$(j=q−i, . . . , q−1) of the initial sequence of $-\frac{\pi}{2}$ are modified. For each value of i, another modified sequence $C_i^-$ is obtained. It is formed by the phases $$\varphi_j^- = \begin{cases} \varphi_j & \text{for } j = 0, \dots, q-i-1 \\ \varphi_j - \frac{\pi}{2} & \text{for } j = q-i, \dots, q-1 \end{cases}$$

h) The final sequence S2 is formed by the sequence whose mean difference is minimal.

For a less complex use, the mean differences $(\phi_1^+)^2$ are calculated based on the initial mean difference $(\sigma_0)^2$. One obtains:

$$(\sigma_i^+)^2 = \sigma_0^2 + 2\pi \sum_{j=q-i}^{q-1} \varphi_j - 2 \cdot (B_i^+) \cdot S -$$

$$2(A_i^+) \cdot S' + b_0[(A_i^+) \cdot q \cdot (q-1) + 2 \cdot (B_i^+) \cdot q - \pi \cdot i] +$$

$$a_0 \left[\frac{(A_i^+) \cdot q \cdot (q-1) \cdot (2q-1)}{3} + (B_i^+) \cdot q \cdot (q-1) - \frac{\pi}{2} \cdot i \cdot (2q-i-1)\right] +$$

-continued $$q \cdot (B_i^+)^2 + (A_i^+) \cdot (B_i^+) \cdot q \cdot (q-1) + \frac{(A_i^+)^2 \cdot q \cdot (q-1) \cdot (2q-1)}{6} -$$

$$\frac{\pi}{2} \cdot (A_i^+) \cdot i \cdot (2q - i - 1) - \pi \cdot (B_i^+) \cdot i + \frac{\pi^2}{4} \cdot i$$

The mean difference $(\sigma_i^-)^2$ is obtained by replacing in the expression of $(\sigma_i^-)^2$:

$\pi$ by $-\pi$, $(A_i^+)$ by $-(A_i^-)$ and $(B_i^+)$ by $-(B_i^-)$.

Figure 5:
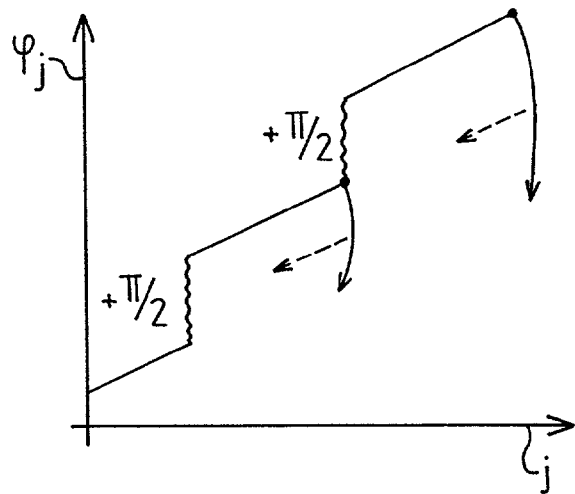
FIG. 5 is a representation of a phase sequence including two phase jumps.

The second example of embodiment of the means 60 for detecting and correcting phase jumps is described with reference to FIG. 5. In FIG. 5 is shown an example of an initial sequence S1 comprising two phase jumps of $$+\frac{\pi}{2}.$$

At step d) the phases are modified by $$+\frac{\pi}{2}$$

for the p symbols from rank q-k-p to q-k-1, and by $+\pi$ for the k symbols from rank q-k to q (k varies between 1 and q and p varies between 1 and q-k).

The modified sequences obtained at step d) are thus written as:

$$\varphi_j^+ = \begin{cases} \varphi_j & \text{for } j = 0, \ldots, q-k-p-1 \\ \varphi_j + \frac{\pi}{2} & \text{for } j = q-k-p, \ldots, q-k-1 \\ \varphi_j + \pi & \text{for } j = q-k, \ldots, q \end{cases}$$

$$\varphi_j^- = \begin{cases} \varphi_j & \text{for } j = 0, \ldots, q-k-p-1 \\ \varphi_j - \frac{\pi}{2} & \text{for } j = q-k-p, \ldots, q-k-1 \\ \varphi_j - \pi & \text{for } j = q-k, \ldots, q \end{cases}$$

And the straight line equations calculated in step e) are written as:

$$D_{p,k}^+ : y = (a_{p,k}^+) \cdot x + (b_{p,k}^+) \text{ with:}$$

$$(a_{p,k}^+) = \alpha \cdot (S'_{p,k})^+ - \beta \cdot (S_{p,k})^+ \text{ and } (b_{p,k}^+) = \gamma \cdot (S_{p,k})^+ - \beta \cdot (S'_{p,k})^+$$

where $(S_{p,k})^+ = \sum_{j=0}^{q-1} \varphi_j^+ = S + p \cdot \frac{\pi}{2} + k \cdot \pi$ and $$(S'_{p,k})^+ = \sum_{j=0}^{q-1} j \cdot \varphi_j^+ = S' + \frac{\pi}{2} \cdot p \cdot \left(q - k - \frac{p+1}{2}\right) + \pi \cdot k \cdot \left(q - \frac{(k+1)}{2}\right)$$

that is to say, $$a_{p,k}^+ = a_0 + \alpha \left[\frac{\pi}{2} \cdot p \cdot \left(q - k - \frac{p+1}{2}\right) + \pi \cdot k \cdot \left(q - \frac{k+1}{2}\right)\right] - \beta \left[p \frac{\pi}{2} + k\pi\right] = a_0 + (A_{p,k}^+)$$

with $(A_{p,k}^+) = \alpha \left[\frac{\pi}{2} \cdot p \cdot \left(q - k - \frac{p+1}{2}\right) + \pi \cdot k \cdot \left(q - \frac{k+1}{2}\right)\right] - \beta \left[p \frac{\pi}{2} + k\pi\right]$ and $b_{p,k}^+ = b_0 + \gamma \left[p \frac{\pi}{2} + k\pi\right] -$ $$\beta \left[\frac{\pi}{2} \cdot p \cdot \left(q - k - \frac{p+1}{2}\right) + \pi \cdot k \cdot \left(q - \frac{k+1}{2}\right)\right] = b_0 + (B_{p,k}^+)$$

with $(B_{p,k}^+) = \gamma \left[p \frac{\pi}{2} + k\pi\right] - \beta \left[\frac{\pi}{2} \cdot p \cdot \left(q - k - \frac{p+1}{2}\right) + \pi \cdot k \cdot \left(q - \frac{k+1}{2}\right)\right]$ For a less complex implementation, the mean differences $(\sigma_{p,k}^+)^2$ are calculated based on the initial mean difference $(\sigma^0)^2$. The following expression is obtained:

$$(\sigma_{p,k}^+)^2 = \sigma_0^2 + 2\pi \sum_{j=q-k}^{q-1} \varphi_j + \pi \sum_{j=q-k-p}^{q-k-1} \varphi_j - 2 \cdot (B_{p,k}^+) \cdot S - 2(A_{p,k}^+) \cdot S' +$$

$$b_0[(A_{p,k}^+) \cdot q \cdot (q-1) + 2 \cdot (B_{p,k}^+) \cdot q - \pi(p+2k)] +$$

$$a_0 \left[\frac{(A_{p,k}^+) \cdot q \cdot (q-1) \cdot (2q-1)}{3} + (B_{p,k}^+) \cdot q \cdot (q-1) - \frac{\pi}{2} \cdot p \cdot\right.$$

$$\left.(2q - 2k - p - 1) - \pi \cdot k \cdot (2q - 2k - 1)\right] + q \cdot (B_{p,k}^+)^2 +$$

$$(A_{p,k}^+) \cdot (B_{p,k}^+) \cdot q \cdot (q-1) + \frac{(A_{p,k}^+)^2 \cdot q \cdot (q-1) \cdot (2q-1)}{6} -$$

$$\frac{\pi}{2} \cdot (A_{p,k}^+) \cdot p \cdot (2q - 2k - p - 1) - \pi \cdot (A_{p,k}^+) \cdot k \cdot$$

$$(2q - k - 1) - \pi \cdot (B_{p,k}^+) \cdot (p + 2k) + \frac{\pi^2}{4} \cdot (p + 4k)$$

The mean difference $(\sigma_{p,k}^-)^2$ is derived from the expression $(\sigma_{p,k}^+)^2$ by replacing $\pi$ by $-\pi$, $(A_{p,k}^+)$ by $-(A_{p,k}^-)$ and $(B_{p,k}^+)$ by $-(B_{p,k}^-)$.

It is evident that the means that have just been described are calculation means advantageously used in the form of a computer program intended to be executed by a microprocessor placed in the receiver.

Figure 2:
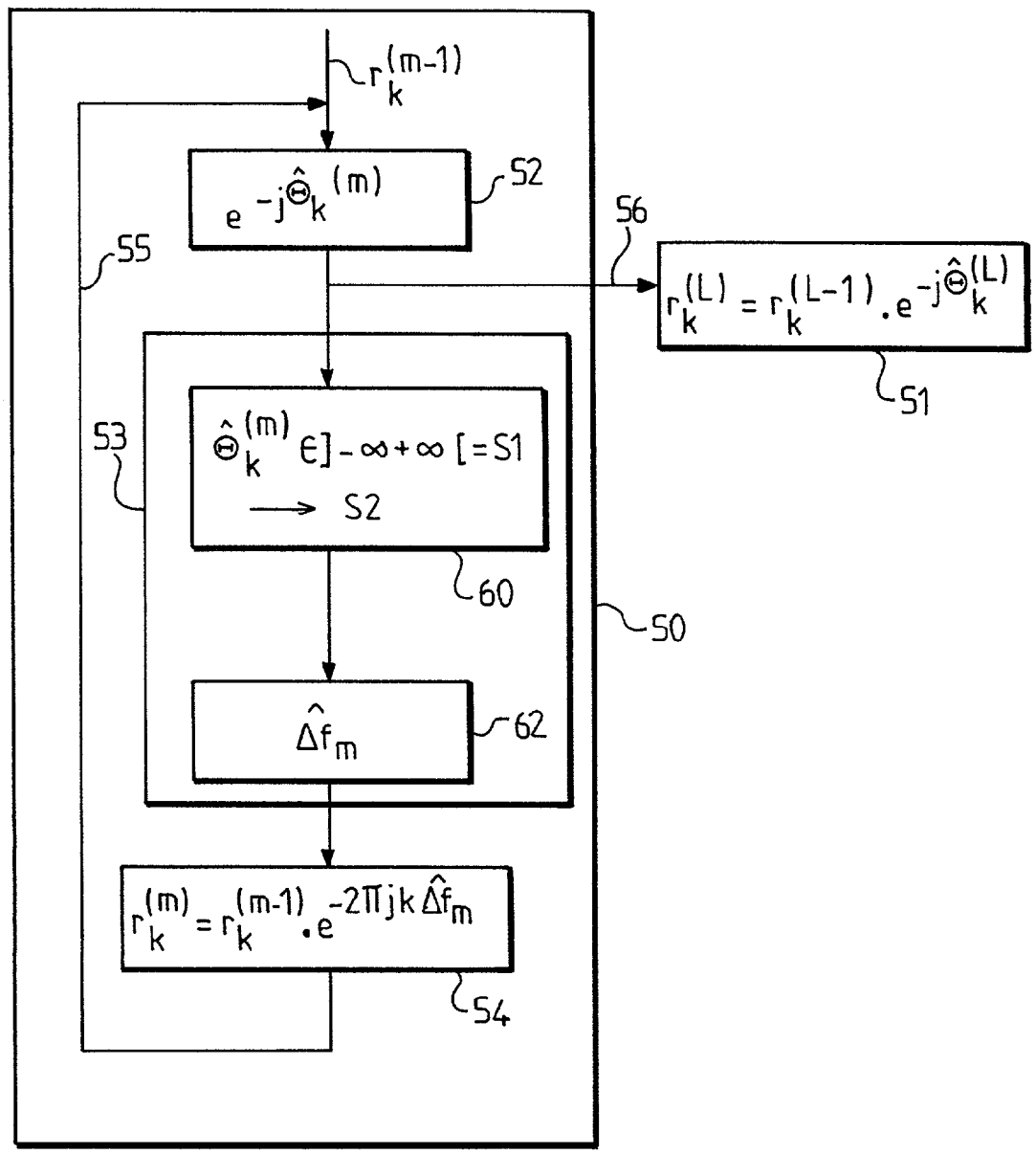
FIG. 2 is a flow chart describing the steps of a phase estimation method.
Figure 6:
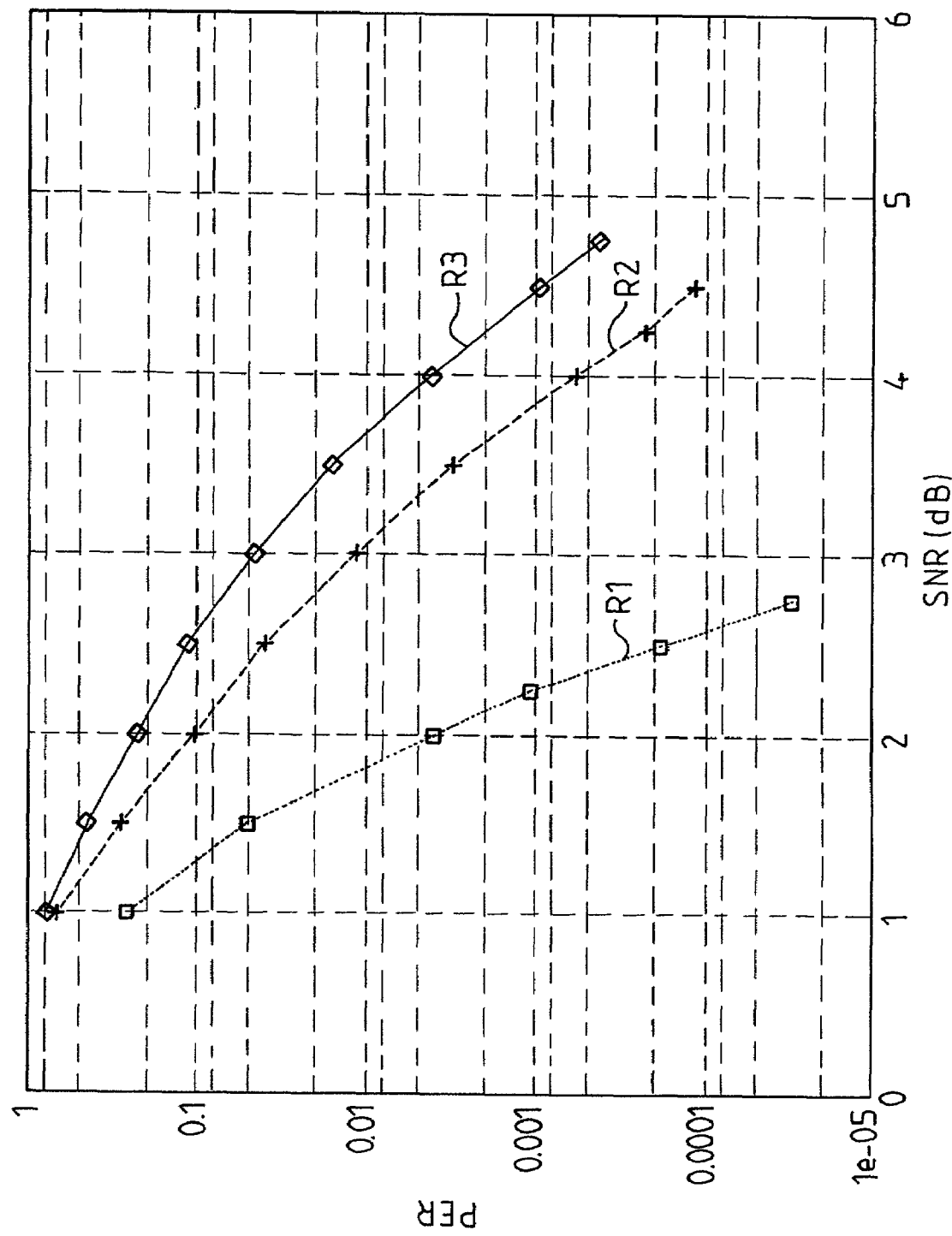
FIG. 6 is a representation in the form of curves of the results obtained with the invention.

In FIG. 6 are shown the results obtained thanks to the invention in a system as described with reference to FIGS. 1 and 2. The curves of FIG. 6 represent the packet error rate (PER) plotted against the signal-to-noise ratio (SNR) in the following three cases:
  curve R3: when the phase jumps are not detected;
  curve R2: when the phase jumps are detected and corrected with the method according to the invention;
  curve R1: for a Gaussian channel (no imperfection as regards either phase or frequency).

These curves have been obtained via:
  a QPSK modulation,
  a random initial frequency error $\Delta f_0$ comprised between −1% and +1% of the symbol frequency,
  a random initial phase error $\theta_0$ comprised between $-\pi$ et $+\pi$,
  packets which comprise a known preamble of 48 symbols $[a_1, \ldots, a_{48}]$ and a payload part $[a_{49}, \ldots, a_{592}]$ of 544 symbols, a frequency recovery algorithm (utilized by the means 23), which uses the packet preambles, and which is applied before the phase estimation, so that the residual frequency error $\Delta f_1$ before the phase estimation is lower than or equal to 0.3% of the symbol frequency, phase estimation means 50 which are formed by a loop which is passed through L=2 times, on transmission, a Reed Solomon coding and a convolution coding which is punctured in 64 states.

The invention is not restricted to the embodiments that have just been described by way of example. More particularly, it relates to any type of receiver that utilizes a frequency error correction device of the Tretter type and, upstream of this device, a phase estimation device based on decisions made on the received symbols.

Moreover, the number of phase jumps that may be detected and corrected by applying this method is arbitrary. When the transmitted data packets are longer, it is possible to have more than two phase jumps. In that case, in order not to complicate the calculations too much, one advantageously chooses to divide the data packets into smaller portiona so as to be in the same position again where one has a maximum of two phase jumps per packet portion. The method described above is thus applied to each portion of the packet. It provides the position and the direction of the various phase jumps. The phases are then corrected by a multiple of $$\frac{\pi}{2}$$

as a function of the direction of the jumps and their number. Then, the Tretter algorithm is applied to this corrected sequence to obtain the final frequency estimate. In order to avoid a jump occurring between two portions of a packet, it is desirable to provide an overlap between the various portions of the same packet.

The method proposed is generally used for any MPSK modulation by considering phase jumps of $\pm 2\pi/M$ (instead of $\pm \pi/2$ for a QPSK modulation).

The invention claimed is:

1. A communication system comprising at least a transmitter and a receiver intended to receive symbols coming from a phase-shift keying modulation, and comprising estimation means for estimating a frequency error relating to a symbol based on a sequence of symbol phases, characterized in that said receiver comprises calculation means for calculating a phase sequence, called an initial sequence, based on decisions made on symbols, and means for detecting and correcting phase jumps in this initial sequence, to supply a phase sequence, called final sequence, to said frequency error estimation means;

wherein said means for detecting and correcting phase jumps comprise:

modifying means for modifying said initial sequence so as to produce a plurality of modified sequences, which each compensate for a phase jump configuration, calculation means for calculating straight line equations which determine the initial sequence and the modified sequences, and calculation means for calculating for the initial sequence and the modified sequences a mean difference between the initial or modified phases and the phases produced by the corresponding straight line equation, said final sequence being formed by the sequence whose mean difference is minimal.

2. A communication system as claimed in claim 1, characterized in that said initial sequence is modified phase-group by phase-group.

3. A receiver intended to be used in a communication system as claimed in claim 1.

4. A receiver as claimed in claim 3, characterized in that said initial sequence is modified phase-group by phase-group.

5. A method of estimating a frequency error relating to a received symbol coming from a phase-shift keying modulation, based on a sequence of symbol phases, characterized in that the method comprises a calculation step of calculating a phase sequence, called initial sequence, based on decisions made on symbols, and a step of detecting and correcting phase jumps in this initial sequence, to produce a phase sequence, called final sequence, used for the estimation of a frequency error;

wherein said step of detecting and correcting phase jumps comprises:

modifying said initial sequence so as to produce a plurality of modified sequences, which each compensate for a phase jump configuration, calculating straight line equations which determine the initial sequence and the modified sequences, and calculating for the initial sequence and the modified sequences a mean difference between the initial or modified phases and the phases produced by the corresponding straight line equation, said final sequence being formed by the sequence whose mean difference is minimal.

6. A method of detecting and correcting phase jumps in an initial sequence of symbol phases coming from a phase-shift keying modulation, characterized in that it comprises:

modifying said initial sequence so as to produce a plurality of modified sequences which each compensate for a phase jump configuration, calculating straight line equations which determine the initial sequence and the modified sequences, and calculating for the initial sequence and the modified sequences a mean difference between the initial or modified phases and the phases produced by the corresponding straight line equation, said final sequence being formed by the sequence whose mean difference is minimal.

7. A method of detecting and correcting phase jumps as claimed in claim 6, characterized in that said initial sequence is modified phase-group by phase-group.

* * * * *